(12) United States Patent
Rauckhorst, III et al.

(10) Patent No.: US 6,247,669 B1
(45) Date of Patent: Jun. 19, 2001

(54) AIRFOIL LOW ICE ADHESION SURFACE

(75) Inventors: Richard Lawrence Rauckhorst, III, North Canton; David Bert Sweet, Canal Fulton, both of OH (US)

(73) Assignee: The B. F. Goodrich Company, Brecksville, OH (US)

( * ) Notice: Subject to any disclaimer, the term of this patent is extended or adjusted under 35 U.S.C. 154(b) by 0 days.

(21) Appl. No.: 09/098,809

(22) Filed: Jun. 17, 1998

Related U.S. Application Data

(62) Division of application No. 08/851,189, filed on May 5, 1997.
(60) Provisional application No. 60/016,962, filed on May 6, 1996, provisional application No. 60/016,900, filed on May 6, 1996, and provisional application No. 60/019,058, filed on May 6, 1996.

(51) Int. Cl.$^7$ .................................................. B64D 15/16
(52) U.S. Cl. ................................... 244/134 A; 244/134 R
(58) Field of Search ............................ 244/134 R, 134 A

(56) References Cited

U.S. PATENT DOCUMENTS

| | | | |
|---|---|---|---|
| 2,446,328 | * | 8/1948 | Heston . |
| 3,690,601 | * | 9/1972 | Roemke . |
| 4,494,715 | * | 1/1985 | Weisend . |
| 4,500,688 | | 2/1985 | Arkles . |
| 4,826,108 | * | 5/1989 | Briscoe et al. . |
| 4,961,549 | * | 10/1990 | LaRue . |
| 5,337,978 | * | 8/1994 | Fahrner et al. . |
| 5,558,304 | * | 9/1996 | Adams . |
| 5,562,265 | * | 10/1996 | Rauckhorst . |

FOREIGN PATENT DOCUMENTS

| | | | |
|---|---|---|---|
| 0646524 | | 4/1995 | (EP) . |
| 542878 | * | 1/1942 | (GB) .............................. 244/134 A |
| 595278 | | 12/1947 | (GB) . |
| 1477055 | | 6/1977 | (GB) . |
| 9006958 | | 6/1990 | (WO) . |

OTHER PUBLICATIONS

Japanese Patent Abstract, vol. 017, No. 111 (M–1376, Mar. 8, 1993, & JP 04 297395 A (Mitsubishi Heavy Ind Ltd), Oct. 21, 1992.
Japanese Patent Abstract, vol. 017, No. 704 (C–1146), Dec. 22, 1993 & JP 05 239381 A (Osaka Gas Co Ltd), Sep. 17, 1993.

* cited by examiner

*Primary Examiner*—Charles T. Jordan
*Assistant Examiner*—Tien Dinh
(74) *Attorney, Agent, or Firm*—Renner, Otto, Boisselle & Sklar LLP

(57) ABSTRACT

A pneumatic deicing system includes a deicer assembly comprised of an outer layer having a low modulus of elasticity, an inner ply, and a plurality of inflatable members provided therebetween for imposing strain in ice accumulated thereon. The deicer assembly is disposed directly on top of and bonded to the leading edge of an airfoil. The deicer has a plurality of large radius spanwise running inflatable members arranged substantially parallel to the leading edge and a plurality of small radius spanwise running inflatable members arranged substantially parallel to the leading edge and disposed chordwise aft of the large radius spanwise running inflatable members. The small radius inflatable members are covered with a low ice adhesion surface.

26 Claims, 6 Drawing Sheets

AIRFOIL LOW ICE ADHESION SURFACE

This application claims benefit of Provisional Applications No. 60/016,962 filed May 6, 1996, Ser. No. 60/016,900 filed May 6, 1996, and Ser. No. 60/019,058 filed May 6, 1996.

This is a division of pending application Ser. No. 08/851,189 file May 5, 1997.

FIELD OF THE INVENTION

The present invention relates to airfoil surfaces and more particularly, an airfoil surface having low ice adhesion properties.

BACKGROUND OF THE INVENTION

Under certain operating conditions aircraft are vulnerable to accumulation of ice on component surfaces. It is well known that such accumulation of ice can lead to disastrous results. A wide variety of systems have been developed for removing ice from aircraft during flight and can be placed into three general categories: thermal, chemical, and mechanical.

The mechanical category of deicing systems operate by distorting the airfoil surface of the aircraft to be deiced. Distortion of the airfoil surface causes cracking in the ice accumulated thereon, and subsequent dispersal of that ice into the air stream passing over the aircraft component.

The principal commercial mechanical deicing means is commonly referred to as pneumatic deicing wherein a component (e.g. the leading edge of a wing) of an aircraft is covered with a plurality of expandable, generally tube-like structures inflatable by employing a pressurized fluid, typically air. Upon inflation, the tubular structures tend to expand substantially the leading edge profile of the wing or strut and crack ice accumulating thereon for dispersal into the air stream passing over the aircraft component. Typically, such tube-like structures have been placed on the leading edge of the aircraft component and configured to extend substantially parallel to said leading edge. The typical inflation time for such pneumatic deicers is between 3 to 6 seconds. The typical air pressure used to inflate the tube-like structures is below 22 psi.

A problem with such leading edge pneumatic deicers, however, is that under certain conditions a buildup of ice occurs on airfoil surfaces chordwise aft of deicer. The thickness of such ice which can be tolerated in this area depends on the airfoil, with some airfoils being extremely sensitive to the presence of such ice. The availability of additional air or energy to deice this increased area, however, may be limited or unavailable.

U.S. Pat. No. 5,112,011 discloses a pneumatic deicer for shedding thin ice which utilizes very high pressure and very small inflated tube radius, the disclosure of which is hereby fully incorporated herein by reference. Such high pressures are not typically available for pneumatic systems, and are impractical because they are too destructive to the pneumatic deicer materials.

Efforts to improve such systems have led to continuing developments to improve their versatility, practicality and efficiency.

DISCLOSURE OF THE INVENTION

According to the present invention, a low ice adhesion material for an airfoil comprises a thermoplastic combined with silicone.

The present invention provides an inexpensive, retrofittable means for preventing the formation of ice on airfoil surfaces.

These and other objects, features, and advantages of the present invention will become more apparent in light of the detailed description of exemplary embodiments thereof, as illustrated by the drawings.

BEST MODE FOR CARRYING OUT THE INVENTION

The present invention provides an apparatus for deicing both the leading edge surface of an airfoil and the area chordwise aft of the leading edge. By "deicing" what is meant is the removal of ice subsequent to formation of the ice upon the leading edge. By "leading edge" what is meant is that portion of a surface of a structure which functions to meet and in substantial measure break an air stream impinging thereon. Examples of leading edges would be forward edge portions of wings, stabilizers, struts, nacelles, propellers, rotating wings, tail rotors, and other housings, objects and protrusions first impacted by an air stream flowing over an aircraft in flight as well as spars, struts and other structural elements of marine vessels, towers and buildings.

Figure 1:
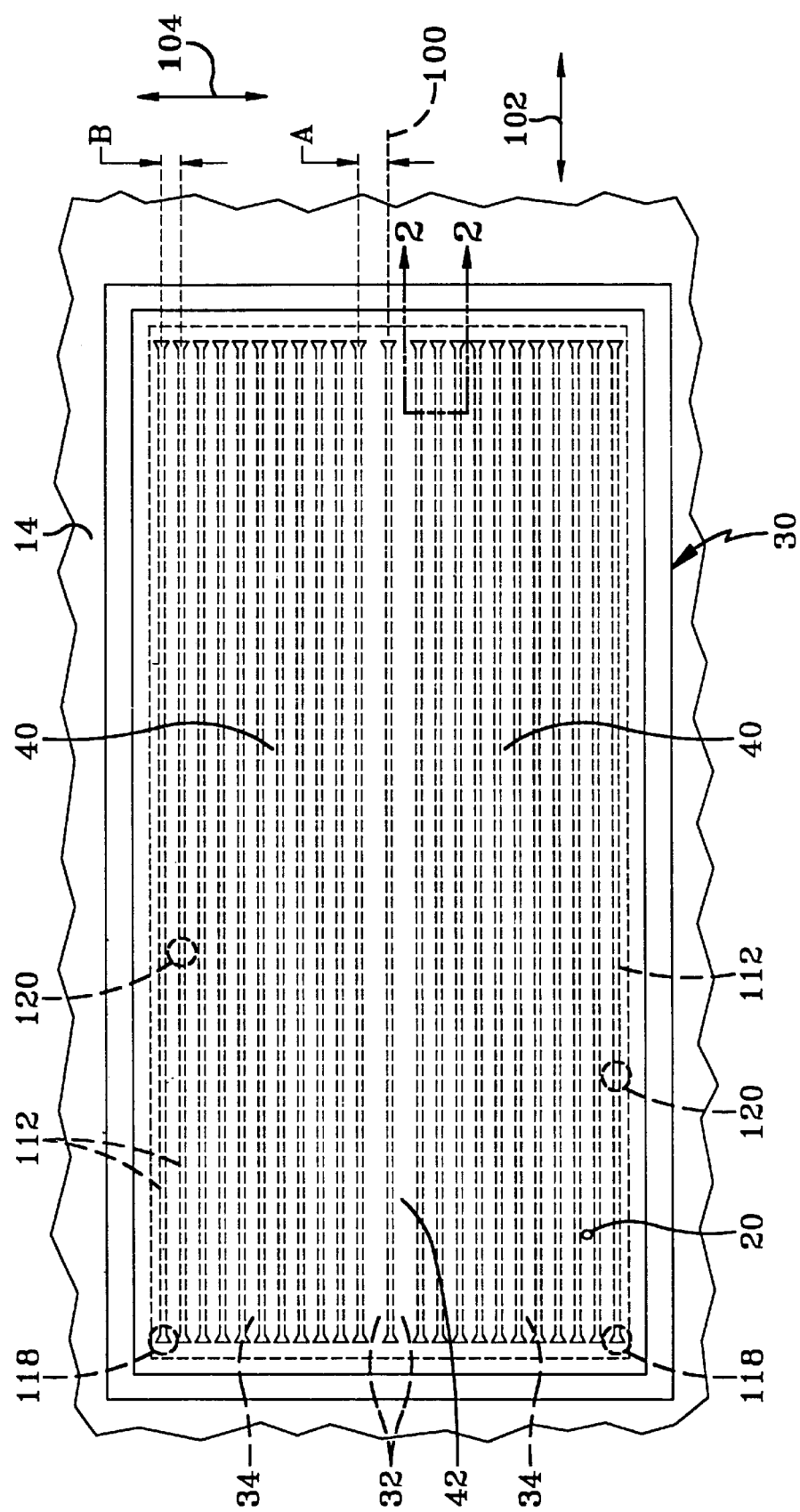
FIG. 1 is a top view of a pneumatic deicing system in accordance with the present invention.

FIG. 1 illustrates a pneumatic deicer 30 in accordance with the present invention formed from a composite having rubbery or substantially elastic properties. The deicer 30 is disposed on an airfoil 14. A plurality of inflatable members or tubes 32, 34 are formed in the composite and are provided pressurized fluid, such as air from a source (not shown) via a connector 20. Connector 20 is integrated into the deicer 12 during manufacturing. Tubes 32, 34 expand or stretch under pressure by 40% or more during inflation cycles, thereby causing a substantial change or distortion in the profile of the deicer (as well as the leading edge) to impose strain in the accumulated ice and cause cracking thereof. The cracked ice is thereafter carried away in the airstream.

Deicer 30 is installed on the airfoil over the leading edge. Surface discontinuities should be eliminated from the airfoil surface. The leading edge has a stagnation line represented by line 100. A stagnation line is defined as the area over the surface of an airfoil where the air velocity is zero. The deicer extends in a chordwise direction (represented by a line 104) and in a spanwise direction (represented by a line 102). The chordwise direction is defined as being approximately parallel to the direction of an impinging airstream as it passes around the deicer 30 and airfoil 14. The spanwise direction is defined as being generally perpendicular to the chordwise direction. If airfoil 14 is a wing, tubes above line 100 would be located on the top of the wing. Inflation tubes 32 extend in the spanwise direction and run substantially parallel to the leading edge, and are located over and in close proximity to the stagnation line 100. A plurality of inflation tubes 34 are located chordwise aft of tubes 32. As will described in greater detail hereinafter, tubes 32, 34 are formed by stitching two layers of the deicer together. The distance between stitch lines for tubes 32 is greater than the distance between the stitch lines for tubes 34. The radius of inflated tubes 32 is therefore greater than the radius of inflated tubes 34. Tubes 34 are referred to as low deflection tubes or small tubes. To this end, the radius of tubes 34 is preferably on the order of one half the radius of tubes 32. The smaller radius tubes 34 make it possible to shed thin layers of ice and in some cases, thinner ice than tubes 32 are able to shed.

In prior pneumatic deicing systems, ice would build up chordwise aft of (or behind) the spanwise running tubes 32 that cover the leading edge. It has been found that ice build up aft of the deicers derived typically from super cooled large droplet ice (SLD Ice) may have critical aerodynamic consequences. However, the amount of additional air available to deice this area may be limited. Secondary tubes 34, which are utilized to deice the airfoil upon ice build up aft of the leading edge primary tubes 32 have a smaller radius of inflation than primary tubes 32. Smaller radius tubes in this area. provide an advantage of being able to shed thinner or less ice than larger radius tubes. Tubes 34 therefore provide two advantages, they can shed small amounts of ice and they don't require as much air volume. Also, tubes 34 have less aerodynamic drag when inflated than tubes 32.

The primary tubes 32 are typically located within about 5%–8% of the chord from the stagnation line of the leading edge. The secondary tubes 34 are typically located more than about 7% of the chord aft from the stagnation line of the leading edge.

As will described in greater detail hereinafter-, tubes 32, 34 are formed by stitching two layers of the deicer together. The distance A across tubes 32 is greater than the distance B across tubes 34. The radius of inflated tubes 32 is therefore greater than the radius of inflated tubes 34. Tubes 34 are referred to as low deflection tubes or small tubes. Distance B is preferably on the order of 0.5 inches to 1 inch. Distance A is preferably on the order of 1 inch to 2 inches. The width A of tubes 32 is therefore preferably double the width B of tubes 34. The smaller radius tubes 34 make it possible to shed thin layers of ice and in some cases, thinner ice than tubes 32 are able to shed.

FIG. 1 illustrates that each tube 32, 34 has a pair 120 of stitch lines defining the edges thereof. The stitch line pairs 120 are necessary because of the higher inflation pressure utilized in the present invention. It is not intended by the present invention to allow air to permeate between stitch line pairs 120. There is therefore no or little-inflation of the deicer between pairs 120. Each pair 120 of stitch lines 112 are stitched into a circuitous pattern, having circuitous ends 118. The preferred pattern for ends 118 is triangular in shape, although other patterns may be utilized. The circuitous pattern of stitch lines 112 prevents the high stress concentrations that would be present at stitch line ends.

Figure 2:
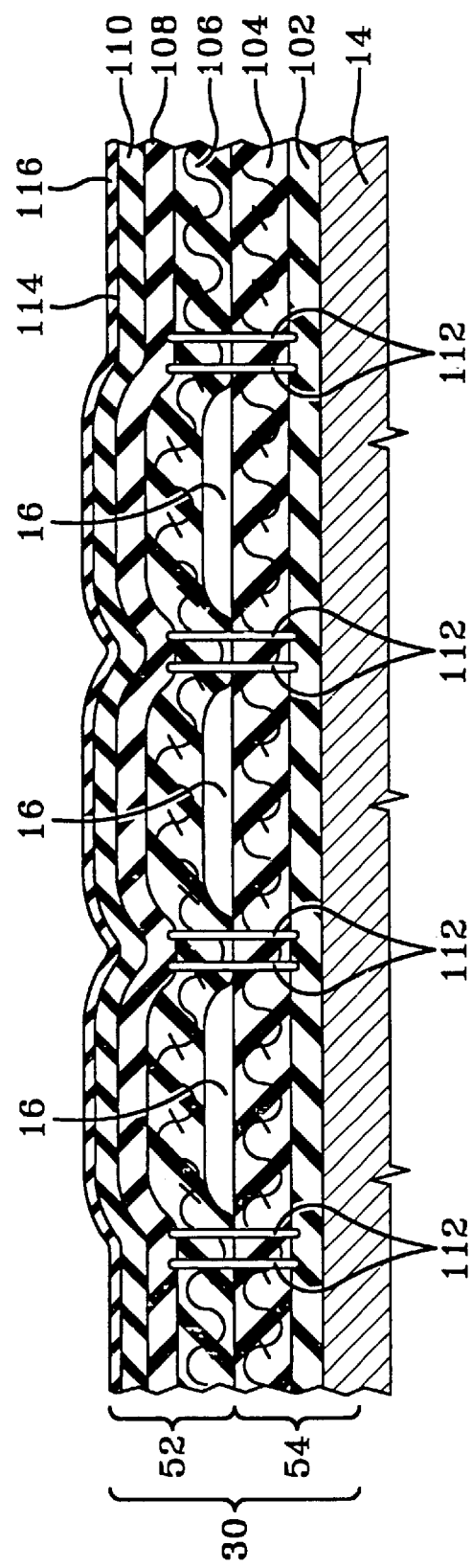
FIG. 2 is a cross sectional view, taken along line 2—2 of FIG. 1, of a pneumatic deicing system in accordance with the present invention.

Referring now to FIG. 2, the preferred construction for deicer assembly 30 of FIG. 1 is a composite, comprised from bottom (the side of material attached to the airfoil 14) to top of: a) a bottom elastomeric layer 102 on the order of 0.01–0.03 inch thick; b) a layer 104 on the order of 0.012 inch thick nonstretchable nylon fabric having rubber or elastomeric coating on one side; c) a layer 106 on the order of 0.020 inch thick stretchable nylon fabric having rubber or elastomeric coating on one side; d) a gum layer 108 on the order of 0.20 to 0.30 inch thick natural rubber; and e) a top elastomeric layer 110 on the order of 0.010 inch thick. Elastomeric layers 102, 110 are preferably made from rubber or rubber-like material such as a plasticizing compound that may include fabric reinforcement, or other compound having a modulus of elasticity of less than 40,000 kPa. Suitable or conventional elastomers or rubber-like materials are well known in the art, such as chloroprenes (such as NEOPRENE®, a registered trademark of E. I. DuPont denemours & Company), nitrile rubbers, ESTANE®, available from the B. F. Goodrich Company (ESTANE is a registered trademark of the B. F. Goodrich Company) or polyurethanes. As will be discussed hereinafter, the top surface 114 of elastomeric layer 110 may be modified with a low ice adhesion layer 116. Tube-like members 32 are created by sewing the nylon layers 104, 106 together in the appropriate pattern. Thread lines 112 illustrate the forming of three tube-like members, which are illustrated in a partially inflated state. The preferred material for thread 112 is nylon or KEVLAR® (a registered trademark of E. I. DuPont denemours & Company). Also for exemplary purposes, all lines in FIG. 1 which are created by sewing thread (as shown in FIG. 2) in this manner are illustrated as thick dotted lines. Layers 102 and 104 may be bonded together utilizing an appropriate cement. Likewise layers 106, 108 and 110 may be bonded together using an appropriate cement. It is to be noted that the bottom layers 102 and 104 comprise a bottom ply 54 and the top three layers 106, 108, 110 comprise a top ply 52.

Referring now to FIGS. 1 and 2, deicer 30 has areas 40 chordwise aft of the leading edge area 42 wherein the top layer 116 (or exposed surface) of deicer 30 in areas 40 is comprised of low ice adhesion material. Area 42 is deiced by primary tubes 32 and areas 40 are deiced by secondary tubes 34. The top elastomeric layer of is preferably ESTANE®, available from the B. F. Goodrich Company (ESTANE is a registered trademark of the B. F. Goodrich Company). The preferred material for the low ice adhesion surface is a thermoplastic modified with a silicone component. The preferred thermoplastic is a Mil-C-83286 Polyurethane paint and/or Mil-C-85285 Polyurethane paint. The preferred amount of silicone component is on the order of 1% to 5% silicone component by total weight, with about 2% being most preferred. The polyurethane paint is an aliphatic urethane coating comprised of two components: a clear aliphatic isocyanate and a pigmented polyester resin. The deicer itself may be comprised of this material or the deicer top layer 110 in FIG. 2 may be treated by spraying or coating with the material to modify top elastomeric layer 112 and form a low ice adhesion top layer 116. Providing a low ice adhesion surface over the leading edge area 42 causes ice to "float" on the deicer. When tubes 32 are inflated, the floating ice does not crack and debond as it should, and therefore stays resident over the leading edge. It is therefore desired for ice to get relatively good adhesion to the deicer over the leading edge area 42. Ice accumulating over areas 40 chordwise aft of the leading edge area 42 does not float on the deicer because of wind forces. It is therefore desirable to have relatively poor ice adhesion to the deicer over the area 40. The poor ice adhesion facilitates lower deflection tubes 34 to be located at these areas. It is preferred that the low ice adhesion areas 40 are provided chordwise aft of the leading edge area, the leading edge area being defined as the area from the stagnation line to about 1%–10% chord aft of the stagnation line. The most preferred area for low ice adhesion coverage being the area beyond about 7% chord aft of the stagnation line.

Figure 3:
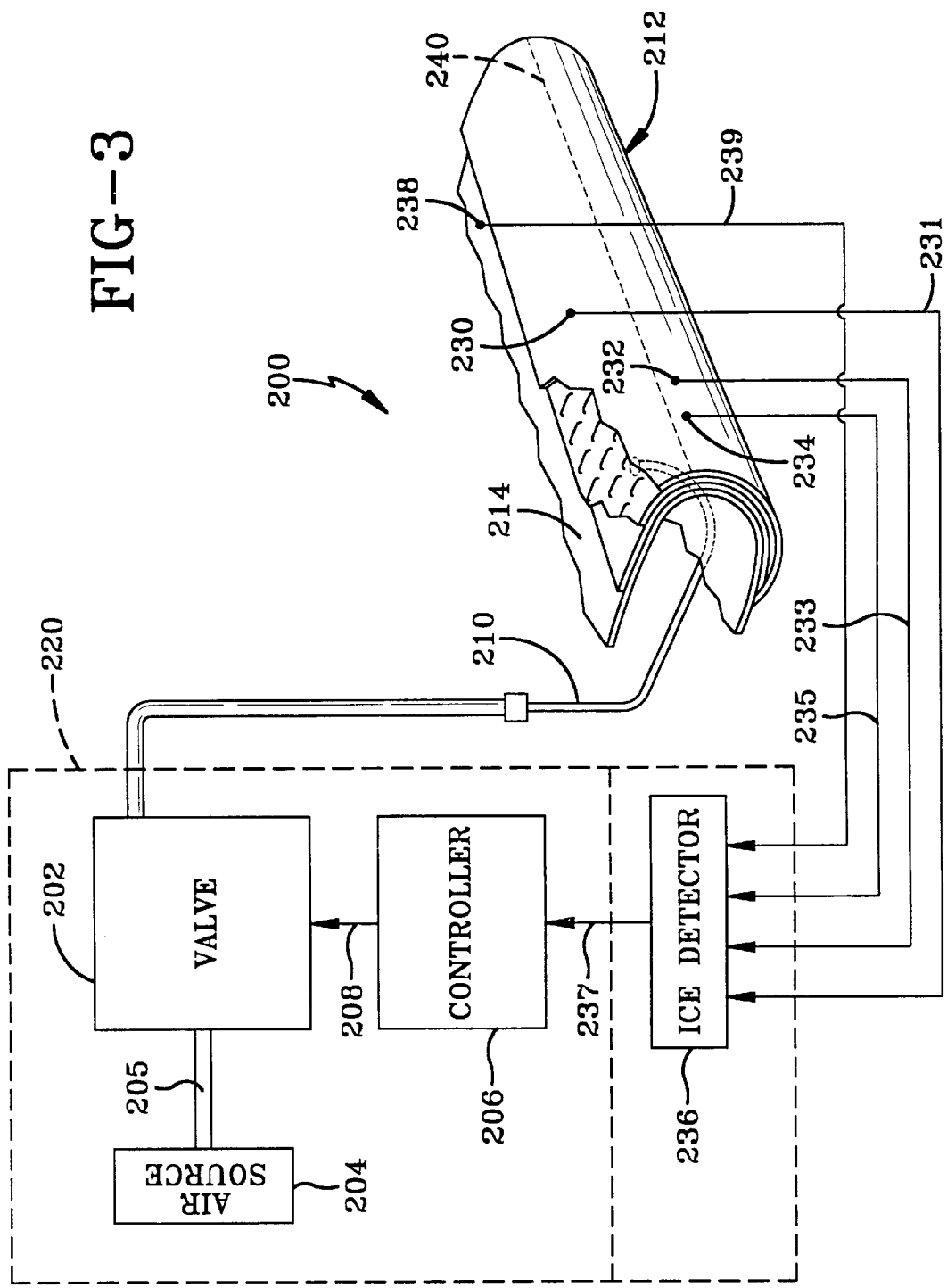
FIG. 3 is a developed top view, partly cut away, of a pneumatic deicing system in accordance with the present invention.

Referring now to FIG. 3, there is shown pneumatic deicing system 200 in accordance with the present invention, comprising a pneumatic valve 202 joined by a conduit 210 to a pneumatic deicing apparatus 212 (deicer) which in the embodiment illustrated is attached to an airfoil 214 such as a wing of an aircraft. The deicer apparatus is preferably formed in accordance with the present invention as illustrated in FIGS. 1 and 2. Valve 202 controls the flow of air from a pressurized air source 204 to the deicer 212 and is controlled by a controller 204 via a line 208. A conduit 205 connects the air source 204 to valve 202. Valve 202 may be any of a number of valves known in the art, such as Model No. 3D2381-62 available from the B. F. Goodrich Company.

Air source 204, valve 202 and controller 206 comprise a pneumatic deicer inflation system or apparatus 220 for inflating pneumatic deicer 212. Pneumatic system 220 may be either a high pressure or low pressure system. What is meant by high pressure is that the air source provides an air pressure on order of 26 psig to 40 psig.

Controller 208 controls valve 202 to thereby control the rate of inflation of deicer 212 and cause deicer 212 to inflate. Controller 212 may be any of a number of programmable control systems known in the art. For instance, controller 212 may be comprised of Model No. 4D2037-TBD available from the B. F. Goodrich Company.

Controller 208 inflates deicer 212 at a relatively high rate of inflation for pneumatic systems. The preferred time of inflation for deicer 212 is from about 1 second to 6 seconds.

Controller 206 may also utilize input via a line 237 from an ice detection circuit 236 which is provided input via lines 231, 233, 235 from ice detection sensors 230, 232, 234, 238. Circuit 236 uses sensors 230, 232, 234, 238 to detect the presence and thickness of ice over the leading edge area (spanwise below line 240) and aft of the leading edge area (chordwise aft of line 240). Controller 206 may energize the primary tubes over the leading edge 32 and the secondary tubes aft of the leading edge 34 either together or independently in response to a signal from circuit 236 indicating the presence of ice in either area. It can be seen that sensor 238 is located aft of the deicer 212. This sensor could be used to indicate the presence of ice located over a low ice adhesion surface in such a location, as will be described hereinafter. The sensors may be integrated into the deicer. Preferable sensors and sensor circuits for use in this application are disclosed in commonly owned U.S. patent application Ser. No. 60/009,159, entitled "IMPEDANCE TYPE ICE DETECTOR", filed provisionally on Dec. 22, 1995, the disclosure of which is fully incorporated herein by reference.

Of course, the air source 204, valve 202 and controller 206, and ice detector circuit 236 may be combined as is deemed necessary.

Figure 4A:
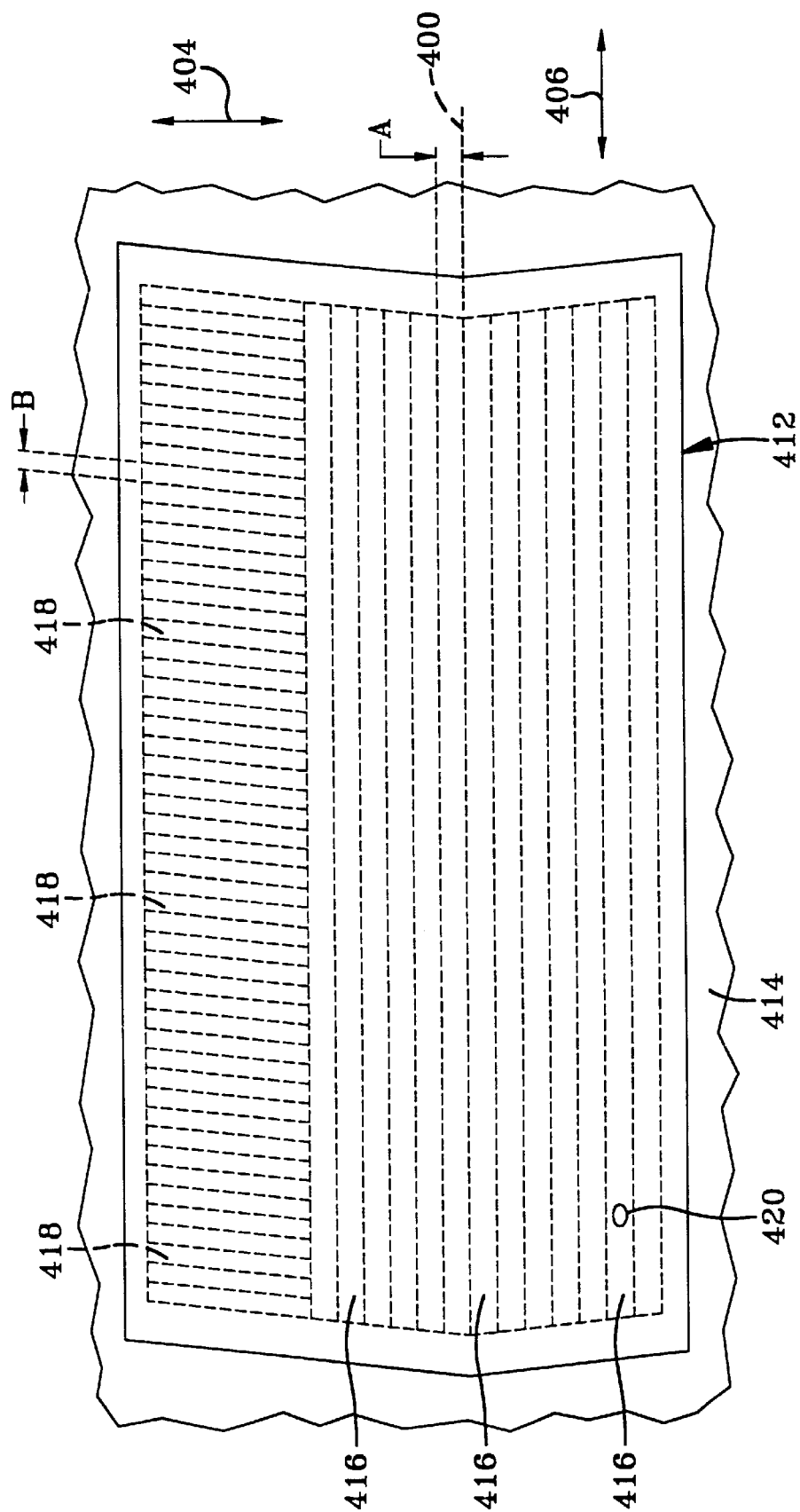
FIGS. 4a is a top view of an alternative pneumatic deicing system in accordance with the present invention.

FIG. 4a illustrates an alternative pneumatic deicer 412 in accordance with the present invention formed from a composite having rubbery or substantially elastic properties. The deicer 412 is disposed on an airfoil 414. A plurality of inflatable members or tubes 416, 418 are formed in the composite and are provided pressurized fluid, such as air from a source (not shown) via a connector 420. Connector 420 is integrated into the deicer 412 during manufacturing. Tubes 416, 418 expand or stretch under pressure by 40% or more during inflation cycles, thereby causing a substantial change or distortion in the profile of the deicer (as well as the leading edge) to impose strain in the accumulated ice and cause cracking thereof. The cracked ice is thereafter carried away in the airstream.

Deicer 412 is installed on the airfoil over the leading edge. Surface discontinuities should be eliminated from the airfoil surface. The leading edge has a stagnation line represented by line 400. The deicer extends in a chordwise direction (represented by a line 404) and in a spanwise direction (represented by a line 406). The chordwise direction is defined as being approximately parallel to the direction of an impinging airstream as it passes around the deicer 412 and airfoil 414. The spanwise direction is defined as being generally perpendicular to the chordwise direction. Inflation tubes 16 extend in the spanwise direction and run substantially parallel to the leading edge. Inflation tubes 418 are disposed chordwise aft of tubes 416 and extend in the chordwise direction and run substantially perpendicular to the leading edge and spanwise tubes 416. Tubes 416 may be referred to as primary tubes and tubes 418 may be referred to as secondary tubes. If airfoil 414 is a wing, tubes 418 would be located on the top of the wing. In prior pneumatic deicing systems, ice would build up chordwise aft of (or behind) the spanwise running tubes 416 that cover the leading edge. It has been found that ice build up aft of the deicers derived typically from super cooled large droplet ice (SLD Ice) may have critical aerodynamic consequences. However, the amount of additional air available to deice this area may be limited. Secondary tubes 418, which are utilized to deice the airfoil upon ice build up aft of the primary tubes 416 have a smaller radius of inflation than primary tubes 416. This is accomplished by making distance A between the stitch lines of tubes 416 greater than the distance B between the stitch lines of tubes 418. Smaller radius tubes in this area provide an advantage of being able to shed thinner or less ice than larger radius tubes. The smaller radius tubes 418 also do not require as much air volume as primary tubes 416.

The primary tubes 416 are typically located within about 5%–8% of the chord from the stagnation line of the leading edge. The secondary tubes 418 are typically located more than about 7% of the chord from the stagnation line of the leading edge. As discussed herein, the outer surface of secondary tubes 418 may be treated with a low ice adhesion material or both primary tubes 416 and secondary tubes 418 may be treated with a low ice adhesion material.

Figure 4B:
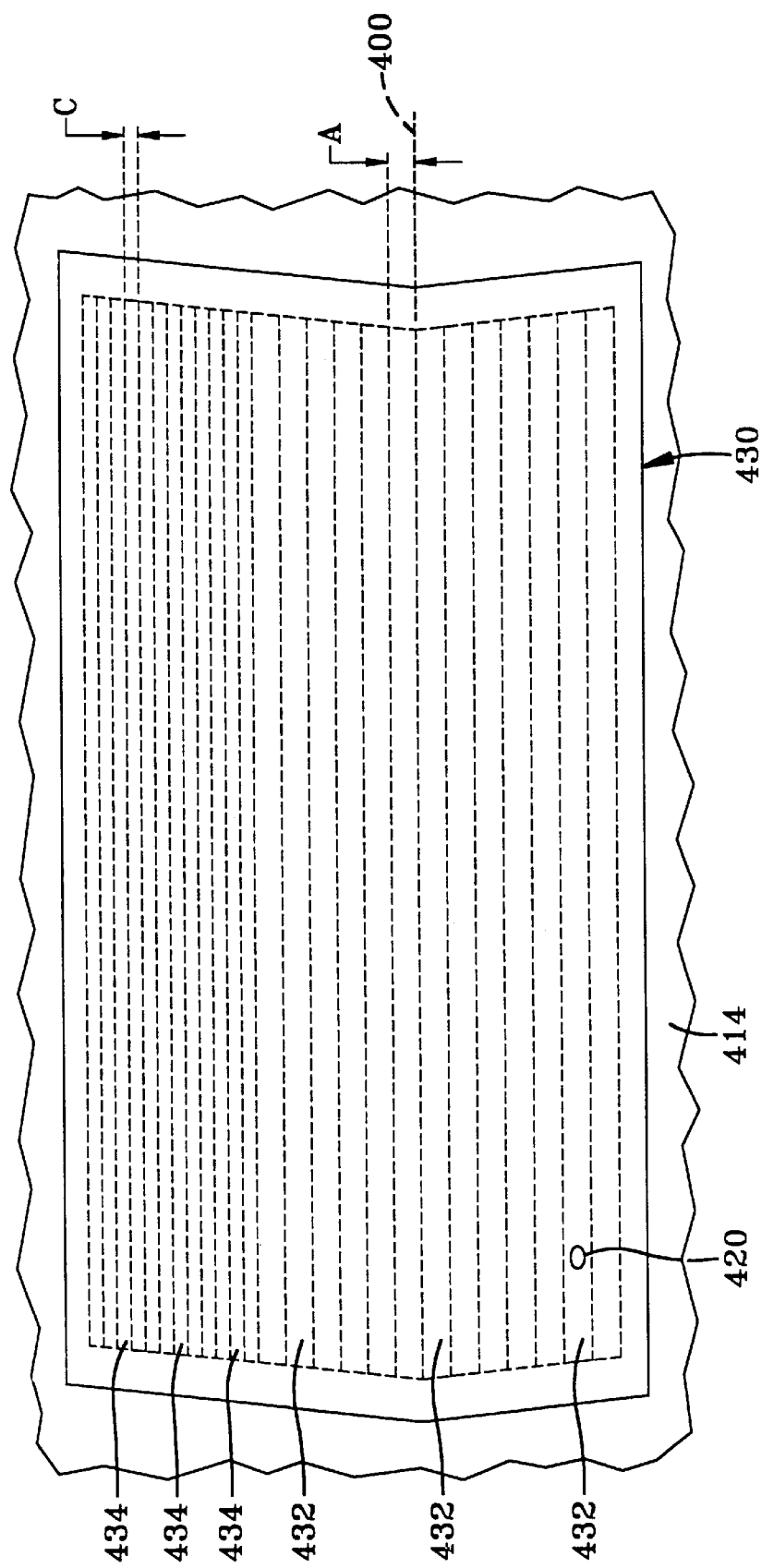
FIG. 4b is a top view of an alternative pneumatic deicing system in accordance with a second embodiment of the present invention.

Referring now to FIG. 4b, wherein an alternative embodiment of a pneumatic deicer 430 in accordance with the present invention is formed substantially similar to that of the deicer shown and described for FIG. 4a. Deicer 430 has primary inflation tubes 432 and secondary inflation tubes 434 which extend along the airfoil in the spanwise direction and run substantially parallel to the leading edge. Primary tubes 432 are located over and in close proximity to the stagnation line 400, and secondary tubes 44 are located chordwise aft of tubes 434. Tubes 432, 434 are formed by stitching two layers of the-deicer together. The distance A between stitch lines for tubes 432 is greater than the distance C between the stitch lines for tubes 434. The radius of inflated tubes 432 is therefore greater than the radius of inflated tubes 434. Tubes 434 are therefore hereinafter referred to as low deflection tubes or small tubes. To this end, the radius of tubes 434 is preferably on the order of one quarter to three quarters the radius of tubes 432, (most preferably one half), with the tubes 432 having a width A of on the order of 0.75 inches to 1 inch and tubes 434 having a width C of on the order of 0.35 inches to 0.50 inches. The smaller inflation radius tubes 434 make it possible to shed thin layers of ice and in some cases, thinner ice or less ice build up than tubes 432 are able to shed. Tubes 434 therefore provide two advantages, they can shed small amounts of ice and they don't require as much air volume as tubes 432. Also, tubes 434 reduce have less aerodynamic drag when inflated than tubes 432.

The primary tubes 432 are typically located within about 5%–8% of the chord from the stagnation line of the leading edge. The secondary tubes 434 are typically located more than about 7% of the chord from the stagnation line of the leading edge. As discussed herein, the outer surface of secondary tubes 434 may be treated with a low ice adhesion material or both primary tubes 432 and secondary tubes 434 may be treated with a low ice adhesion material.

Figure 4C:
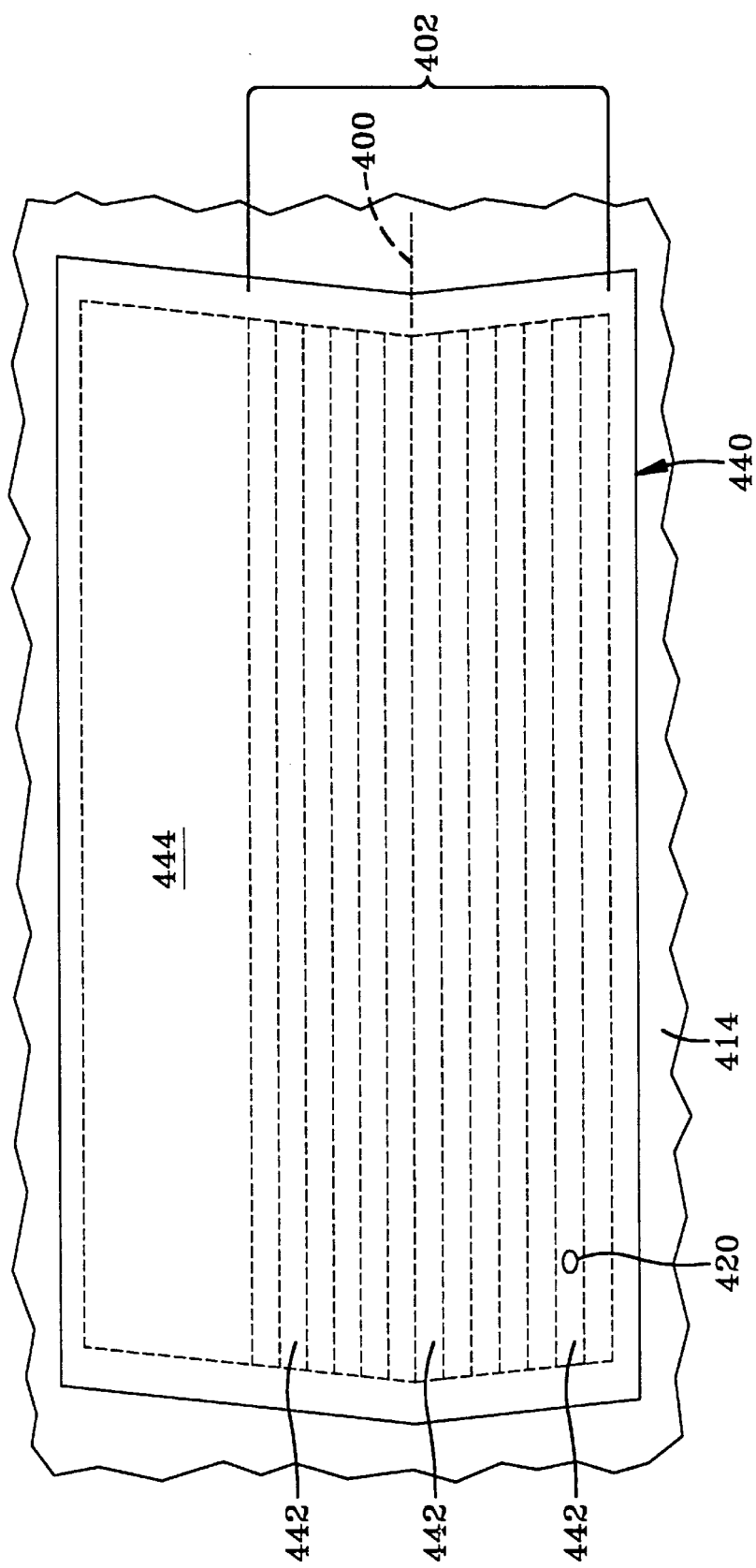
FIG. 4c is a top view of an alternative pneumatic deicing system in accordance with a third embodiment of the present invention.

Referring now to FIG. 4c, wherein an alternate embodiment of a deicer 440 in accordance with the present invention is shown. Deicer 440 has an active deicing area 402 having a skin deflection means in the form of inflation tubes 442 which extend along the airfoil in the spanwise direction and run substantially parallel to the leading edge. Active deicing area is located over the leading edge area of the airfoil, the leading edge being divided by a stagnation line 400. The active deicing area is comprised of pneumatic tubes 442 located over the leading edge. Chordwise aft of tubes 442 is a section 444 of deicer having an exposed or surface layer of low ice adhesion material. To this end, the deicer itself may be comprised of this material or the surface of the deicer top layer (110 in FIG. 2) may be treated by spraying or coating with the material to create a low ice adhesion layer (116 in FIG. 2). It may also be possible to simply treat the airfoil surface 414 with said low ice adhesion material, thereby eliminating the need to extend the deicer much beyond tubes 442. The airfoil itself would therefore become the low ice adhesive surface chordwise aft of the deicer 440. Of particular use for the low ice adhesion material of the present invention is on rotating airfoils, such as propellers or rotor blades. Use of the low ice adhesion material for these applications could eliminate the need for an active, energy using deicer on these airfoils.

It is to be noted that other types of active deicing areas 402 or elements other than the inflatable tubes shown herein maybe utilized in the present invention. For instance, the active area 402 may be comprised of other types of leading edge deicers, such as high pressure impulse type pneumatic deicers. Other types of deicers are described in commonly owned U.S. Pat. Nos. 5,098,037, 5,351,918 and 4,865,291, the disclosures of which is hereby fully incorporated herein by reference. Active area 402 may also be comprised of an electromagnetic deicing apparatus, examples of which are presented in U.S. Pat. Nos. 4,678,144, 5,129,598, 5,152,480, 5,047,497, 4,501,398, 5,553,815, and 5,429,327, the disclosures of which are hereby fully incorporated herein by reference. Active area 402 may also be comprised of an electrothermal deicer having a skin heating means. Such a skin heating means may be any of a number of heating apparatus known to those skilled in the art. Examples of such heating means are presented in U.S. Pat. Nos. 2,599,059, 2,992,317, 5,351,918, 5,475,204 and U.S. Pat. Reexamination Certificate No. 4,386,749, the disclosures of which are hereby fully incorporated herein by reference.

Use of the low ice adhesive surface aft of the active deicing area 402 eliminates the need to provide additional air or energy behind the deicer.

It is to be noted that combinations of the different embodiments for a deicer in accordance the present invention is within the contemplation of the inventors. For instance, with respect to FIGS. 4a, it is possible to make chordwise extending tubes 418 low deflection tubes (such as is shown and described in FIG. 4b). It is also possible to make deicing systems such as is shown and described in FIGS. 4a and 4b, wherein the surface layer of the deicer section aft (the section where tubes 418, 434 are located) of the leading edge spanwise tubes is comprised of low ice adhesion material.

Although the invention has been shown and described with exemplary embodiments thereof, it should be understood by those skilled in the art that the foregoing and various other changes, omissions and additions may be made therein and thereto without departing with the spirit and the scope of the invention.

What is claimed is:

1. A pneumatic deicer for attachment to the leading edge of an airfoil having a chordwise and spanwise length, said deicer comprising:

first and second portions disposed on opposite sides of a stagnation line for positioning on opposite sides of the airfoil, respectively;

said first and second portions including a top layer having a modulus of elasticity of less than 40,000 kPa;

said first and second portions together including at least three larger radius inflatable members extending longitudinally in a spanwise direction;

one of said first and second portions including at least two of said larger radius inflatable members and a plurality of smaller radius inflatable members disposed chordwise aft of said at least one of said larger radius inflatable members; and said larger and smaller inflatable members being operable when inflated to distort said top layer in order to impose strain in ice accumulated thereon.

2. A pneumatic deicer in accordance with claim 1, wherein the smaller radius inflatable members extend longitudinally in a spanwise direction.

3. A pneumatic deicer in accordance with claim 1, wherein the smaller radius inflatable members extend longitudinally in a chordwise direction.

4. A pneumatic deicer in accordance with claim 1, wherein said smaller inflatable members have about the same radius, the larger inflatable members have about the same radius, and the radius of the smaller radius inflatable members are on the order of one half the radius of the larger radius inflatable members.

5. A pneumatic deicer in accordance with claim 1, wherein for a particular airfoil the larger radius inflatable members are located within a distance on the order of 5% to 8% of the chord of the airfoil from the stagnation line.

6. A pneumatic deicer in accordance with claim 5 in combination with the airfoil, the deicer being installed on the airfoil with the stagnation line aligned with the stagnation line of the airfoil.

7. A pneumatic deicer in accordance with claim 1, wherein for a particular airfoil the smaller radius inflatable members beyond a distance on the order of 7% of the chord from the stagnation line.

8. A pneumatic deicer in accordance with claim 7 in combination with the airfoil, the deicer being installed on the airfoil with the stagnation line aligned with the stagnation line of the airfoil.

9. A pneumatic deicer in accordance with claim 1, wherein the top layer comprises an elastomeric layer covered with a thermoplastic modified with a silicone component to provide low ice adhesion.

10. A pneumatic deicer in accordance with claim 1, wherein the top layer over the smaller radius inflatable members comprises an elastomeric layer covered with a thermoplastic modified with a silicone component to provide low ice adhesion.

11. A pneumatic deicer in accordance with claim 1, wherein the larger radius inflatable members have about the same radius, and the smaller radius inflatable members have a radius on the order of one half the radius of the larger radius inflatable members.

12. A pneumatic deicer in accordance with claim 1 in combination with the airfoil, the deicer being installed on the airfoil with the stagnation line aligned with the stagnation line of the airfoil.

13. A pneumatic deicer for attachment to the leading edge of an airfoil having a chordwise and spanwise length, said deicer comprising:

first and second portions disposed on opposite sides of a stagnation line for positioning on opposite sides of the airfoil, respectively;

said first and second portions including a top layer having a modulus of elasticity of less than 40,000 kPa;

one of said first and second portions including a plurality of first inflatable members extending longitudinally in a spanwise direction and a plurality of second inflatable members extending longitudinally in a chordwise direction and disposed chordwise aft of said first inflatable members; and said inflatable members being operable when inflated to distort said top layer in order to impose strain in ice accumulated thereon.

14. A pneumatic deicer in accordance with claim 13, wherein the said second inflatable members are smaller widthwise than the the first inflatable members.

15. A pneumatic deicer in accordance with claim 13, wherein the second inflatable members have a width on the order of one half the width of the first inflatable members.

16. A pneumatic deicer in accordance with claim 13, wherein for a particular airfoil the first inflatable members are located within a distance on the order of 5% to 8% of the chord of the airfoil from the stagnation line.

17. A pneumatic deicer in accordance with claim 16 in combination with the airfoil, the deicer being installed on the airfoil with the stagnation line aligned with the stagnation line of the airfoil.

18. A pneumatic deicer in accordance with claim 13, wherein for a particular airfoil the second inflatable members are located a distance on the order of 7% of the chord of the airfoil from the stagnation line.

19. A pneumatic deicer in accordance with claim 18 in combination with the airfoil, the deicer being installed on the airfoil with the stagnation line aligned with the stagnation line of the airfoil.

20. A pneumatic deicer in accordance with claim 13, wherein the top layer comprises an elastomeric layer covered with a thermoplastic modified with a silicone component to provide low ice adhesion.

21. A pneumatic deicer in accordance with claim 13, wherein the top layer over the chordwise running inflatable members comprises an elastomeric layer covered with a thermoplastic modified with a silicone component to provide low ice adhesion.

22. A pneumatic deicer in accordance with claim 13, wherein the first inflatable members have about the same radius, and the second inflatable members have a radius on the order of one half the radius of the first inflatable members.

23. A pneumatic deicer in accordance with claim 13 in combination with the airfoil, the deicer being installed on the airfoil with the stagnation line aligned with the stagnation line of the airfoil.

24. A pneumatic deicer for attachment to the leading edge of an airfoil having a chordwise and spanwise length, said deicer comprising:

a top layer having a modulus of elasticity of less than 40,000 kPa;

a plurality of larger radius inflatable members that extend longitudinally in a spanwise direction; and plurality of smaller radius inflatable members disposed chordwise aft of said larger radius inflatable members and extending longitudinally in the spanwise direction, and wherein said inflatable members are operable when inflated to distort said top layer in order to impose strain in ice accumulated thereon.

25. A pneumatic deicer in accordance with claim 24, wherein the larger radius inflatable members have about the same radius, and the smaller radius inflatable members have a radius on the order of one half the radius of the larger radius inflatable members.

26. A pneumatic deicer in accordance with claim 24 in combination with the airfoil, the deicer being installed on the airfoil with the stagnation line aligned with the stagnation line of the airfoil.

* * * * *